US006389284B1

(12) United States Patent
Cook et al.

(10) Patent No.: US 6,389,284 B1
(45) Date of Patent: May 14, 2002

(54) SYSTEM AND METHOD FOR CONTROLLING WIRELESS NETWORK ACCESS

(75) Inventors: Charles I. Cook, Louisville; Scott C. Bundy, Broomfield, both of CO (US)

(73) Assignee: Qwest Communications International, Inc., Denver, CO (US)

( * ) Notice: Subject to any disclaimer, the term of this patent is extended or adjusted under 35 U.S.C. 154(b) by 0 days.

(21) Appl. No.: 09/320,859

(22) Filed: May 27, 1999

(51) Int. Cl.[7] .................................................. H04Q 7/20
(52) U.S. Cl. ........................ 455/434; 455/515; 455/435; 455/3.05; 455/517; 455/411
(58) Field of Search ................................ 455/435, 434, 455/432, 456, 515, 524, 525, 411, 419, 410, 418, 551, 527, 528, 3.05, 462, 463, 464, 517, 518, 519, 574, 343; 380/247, 270

(56) References Cited

U.S. PATENT DOCUMENTS

| 5,737,330 A | * | 4/1998 | Fulthorp et al. | ............ 455/517 |
| 5,870,685 A | * | 2/1999 | Flynn | ......................... 455/573 |
| 5,883,885 A | * | 3/1999 | Raith | ......................... 370/311 |

* cited by examiner

Primary Examiner—Lee Nguyen
Assistant Examiner—Rafael Perez-Gutierrez
(74) Attorney, Agent, or Firm—Brooks & Kushman P.C.

(57) ABSTRACT

A system and method for controlling network access for a wireless user subscriber unit having a device identity that utilizes listen-before-talk techniques. A base station is configured to transmit a set of device identities corresponding to a set of valid subscriber units. A user subscriber unit is configured to listen for a device identity corresponding to the user subscriber unit. Further, the user subscriber unit is configured to transmit a request for network access upon receiving the device identity corresponding to the user subscriber unit when network access is desired.

23 Claims, 3 Drawing Sheets

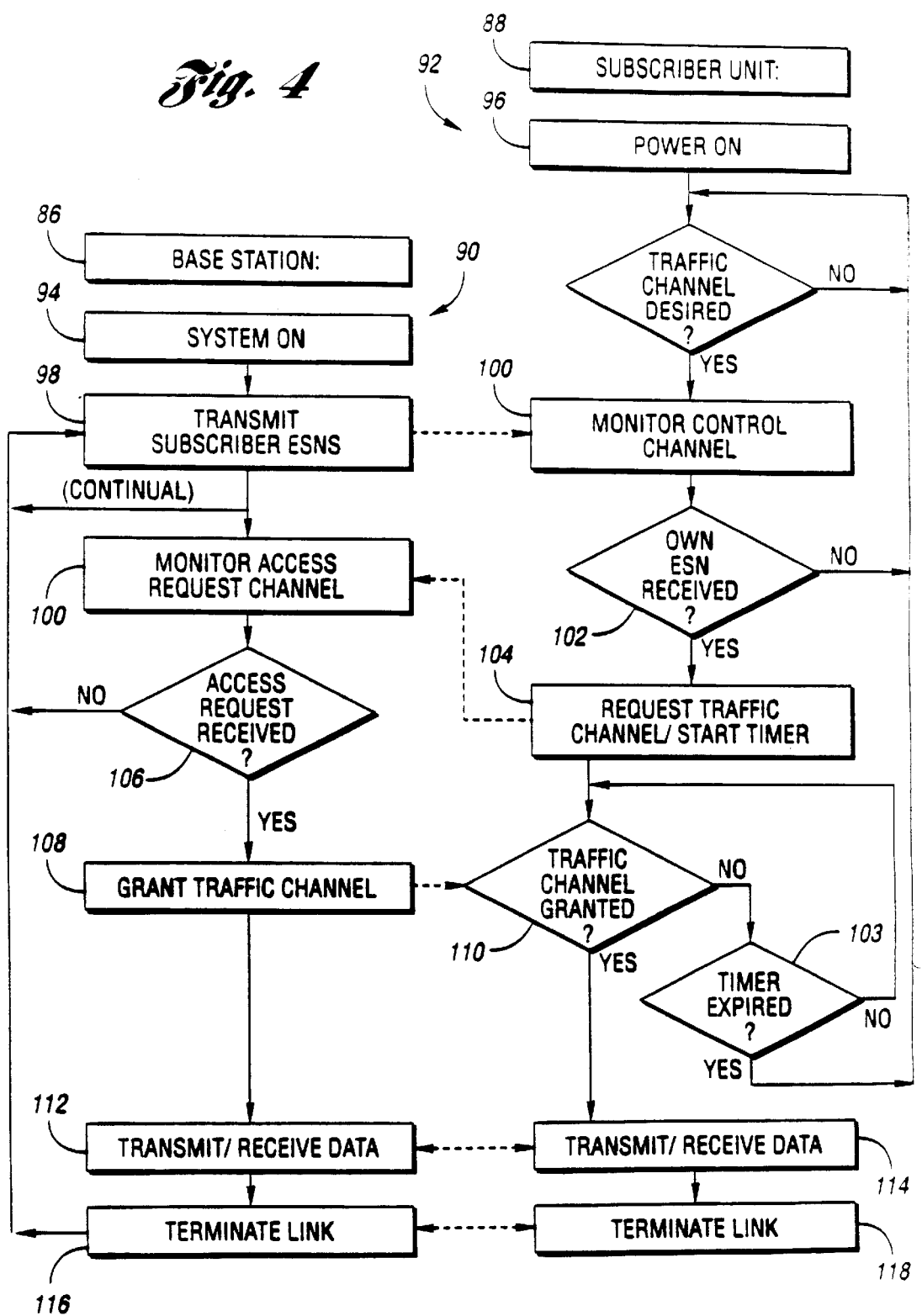

SYSTEM AND METHOD FOR CONTROLLING WIRELESS NETWORK ACCESS

TECHNICAL FIELD

The present invention relates to a system and method for controlling wireless network access.

BACKGROUND ART

In an existing wireless network, a number of base stations that are geographically spaced apart from each other are connected to a wireless switching center. Each base station is equipped with a transceiver for communicating with wireless devices within the range of that base station. The wireless devices or subscriber units each have a unique device identity.

Generally, when a subscriber unit is turned on, the subscriber unit transmits its device identity. The nearest base station receives the device identity, and is thus informed of the presence of that particular subscriber unit. As such, the subscriber unit may travel through different geographic locations, passing through the receiving zones of several different base stations, with each base station detecting the subscriber unit by receiving the periodically transmitted device identity. Because there are multiple service providers, a subscriber unit may sometimes pass from one provider's service area to another provider's service area, while continuing to transmit its device identity.

Another existing wireless device technology used in some personal communication systems utilizes channel scanning before transmission. A device in such a system will first look for an open channel, and upon finding one will begin transmitting.

Although such arrangements have been used in many applications that are commercially successful, particularly for mobile wireless applications, that success is founded upon the cooperation of the many different providers. As such, these existing subscriber units may be somewhat undesirable if one of the providers does not want to be receiving over-the-air transmissions from other providers' subscriber units (or if such transmissions would violate FCC regulation for the frequencies in use), as the case may be for fixed wireless applications.

For the foregoing reasons, there is a need for a system and method for controlling wireless network access that overcomes the problems and limitations of the prior art.

DISCLOSURE OF INVENTION

It is, therefore, an object of the present invention to provide a system and method for controlling wireless network access that utilizes listen-before-talk techniques such that the subscriber unit only transmits when the base station allows such transmission.

In carrying out the above object, and other objects, features, and advantages of the present invention, a method for controlling wireless network access for a wireless user subscriber unit having a preferably unique device identity is provided. The method comprises listening with the user subscriber unit, and transmitting a set of device identities corresponding to a set of valid subscriber units from a base station. The method further comprises, upon receiving the device identity corresponding to the user subscriber unit at the user subscriber unit, transmitting a request for network access with the user subscriber unit. In a preferred embodiment, each device identity is an electronic serial number (ESN).

Further, in a preferred embodiment, the method comprises granting network access to the user subscriber unit upon receiving the request for network access at the base station. Further, preferably, transmit power of the user subscriber unit is controlled by the base station. Further, preferably, the base station may send a terminate request to the subscriber unit, and in response, the user subscriber unit and the base station discontinue transmissions between each other. Transmissions are discontinued upon the terminate request being received at the user subscriber unit. Preferably, the user subscriber unit will autonomously cease transmissions after expiring of a timer if the subscriber unit ceases to receive permission from the base station.

Further, preferably, the user subscriber units may send a terminate request to the base station. Accordingly, transmissions between the user subscriber unit and the base station are discontinued upon the base station receiving the terminate request.

Still further, in a preferred embodiment, a plurality of sets of device identities are transmitted from a corresponding plurality of base stations. The set of device identities that is transmitted from a particular base station is based on a location of the particular base station. As such, each base station transmits device identities of those devices that are permitted to transmit when within range of that base station.

Further, in one embodiment, the base station transmits a first set of device identities corresponding to a first set of valid subscriber units on a generally periodic basis with a first period. Further, the base station transmits a second set of device identities corresponding to a second set of valid subscriber units from the base station on a generally periodic basis with a second period. The second period is different than the first period. That is, one set of device identities may be transmitted more often than the other set of device identities when one group of valid subscriber units is expected to require access more often than the other group of subscriber units. Further, there may be any number of different device identity sets and periods that may be used to increase or decrease responsiveness to subscriber access based on subscriber activity or other parameters that the service provider may implement such as time of day, network load, priorities, etcetera.

Further, a preferred method comprises granting a specified amount of time for response from the set of valid subscriber units upon transmitting the set of device identities. The request for network access must then be transmitted by the user subscriber unit within the specified amount of time.

Further, in carrying out the present invention, a method for controlling wireless network access for a wireless user subscriber unit having a device identity is provided. The method comprises listening with the user subscriber unit, transmitting a set of device identities corresponding to a set of valid subscriber units from a base station, and granting a specified amount of time for response from the set of valid subscriber units upon transmitting the set of device identities. The method further comprises, upon receiving the device identity corresponding to the user subscriber unit, transmitting a request for network access from the user subscriber unit within the specified amount of time. Network access is granted to the user subscriber unit by the base station upon receiving the request for network access at the base station.

Still further, in carrying out the present invention, a system for controlling wireless network access is provided. The system comprises a user subscriber unit and a base station. The user subscriber unit is configured to listen for a (preferably unique) device identity corresponding to the user subscriber unit. The user subscriber unit is further configured to transmit a request for network access upon receiving the device identity corresponding to the user subscriber unit, when network access is desired. The base station is configured to transmit a set of device identities corresponding to a set of valid subscriber units.

In a preferred system, the base station is further configured to grant a specified amount of time for response from the set of valid subscriber units upon transmitting the set of device identities. Further, the base station is configured to grant network access to the user subscriber unit upon receiving the request for network access at the base station within the specified time for response.

Yet further, in carrying out the present invention, a wireless user device for use in a fixed, portable, or mobile wireless network is provided. In the fixed, portable, or mobile wireless network, the user wireless device is permitted to access the network when the user wireless device is within a pre-selected fixed region with at least one operational base station in the region to permit network access. Network access is permitted for a predetermined plurality of wireless devices including the user wireless device.

The user wireless device comprises a user subscriber unit configured to listen for a device identity corresponding to the user subscriber unit. The device identity is transmitted along with a plurality of other device identities corresponding to other wireless devices by at least one base station. The user subscriber unit is further configured to transmit a request for network access after receiving the device identity corresponding to the user subscriber unit, when network access is desired. Alternatively, a set of valid device identities could be indicated by the broadcasting of an exception list. That is, all subscriber units except those in the exception list may access the network.

The advantages associated with embodiments of the present invention are numerous. For example, embodiments of the present invention propose a non-interfering wireless access scheme in which each base station periodically transmits the device identity of valid subscriber units in the network. Reception of its own device identity from the base station allows the subscriber unit to request wireless access on an as-needed basis. As such, embodiments of the present invention provide wireless access while minimizing potential interference to other service providers, and eliminating the potential for violating FCC regulations in frequency bands where transmission in other service provider's territory is strictly forbidden.

Additionally, embodiments of the present invention may be configured to divide the broadcasts of device identities into local and roaming lists. This permits differentiation in how lists for local users are maintained from those that are roaming to increase efficiency and responsiveness.

The above object and other objects, features, and advantages of the present invention are readily apparent from the following detailed description of the best mode for carrying out the invention when taken in connection with the accompanying drawings.

BRIEF DESCRIPTION OF DRAWINGS

FIG. 4 is a block diagram illustrating preferred systems and methods of the present invention in operation.

BEST MODE FOR CARRYING OUT THE INVENTION

Figure 1:
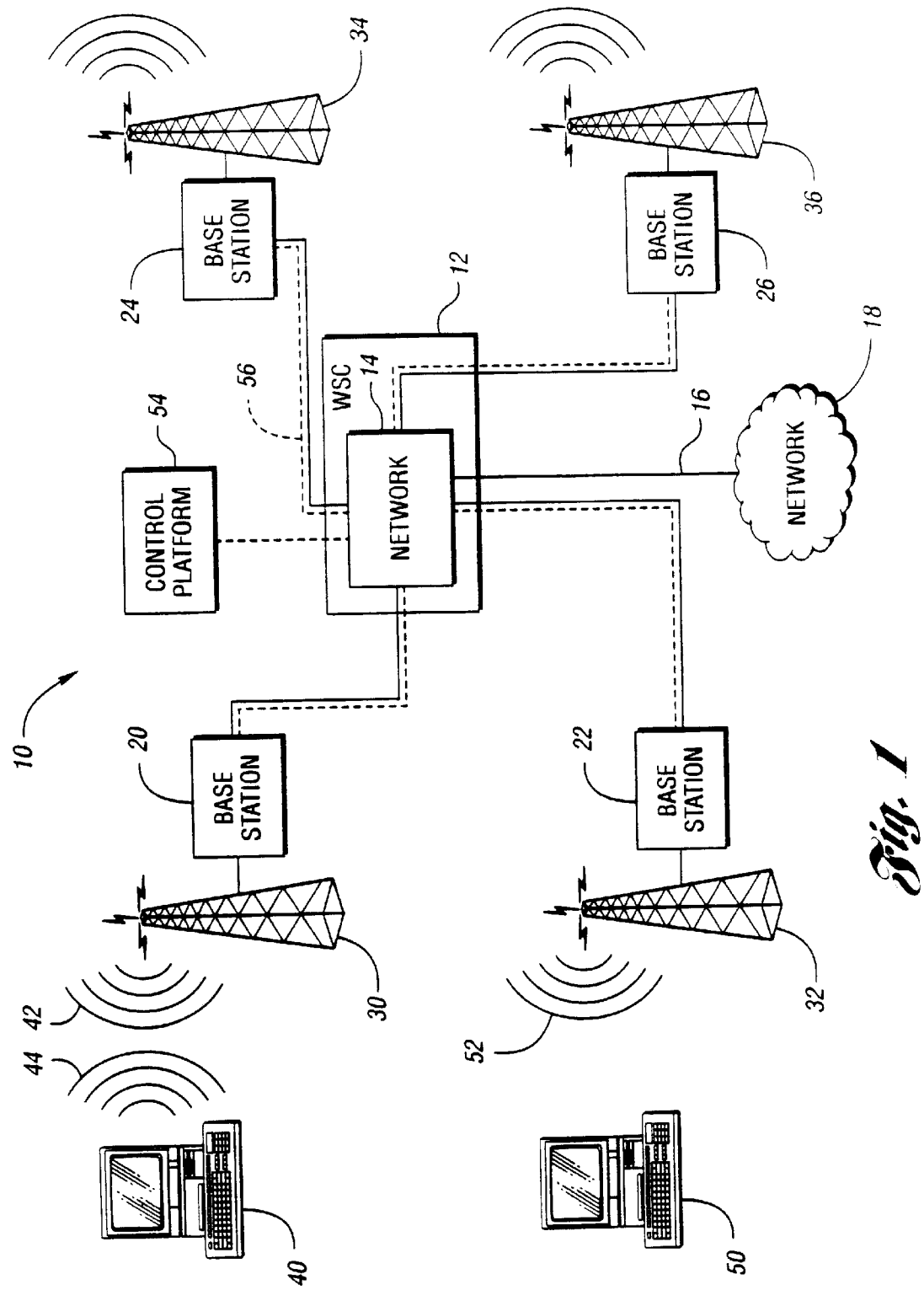
FIG. 1 is a system of the present invention for controlling wireless network access using a listen-before-talk technique.

With reference to FIG. 1, a system of the present invention is generally indicated at 10. System 10 includes a wireless switching center 12. Wireless switching center 12 includes a network 14 that may optionally be connected by communication line 16 to external network 18. Further, system 10 includes a plurality of base stations 20, 22, 24, 26. The base stations are generally geographically spaced apart from each other. Each base station is capable of transmitting and receiving signals. As illustrated, base stations 20, 22, 24, 26 utilize corresponding transmitter/receivers 30, 32, 34, 36.

As is appreciated by those in the communication systems art, some frequency bands, such as Microwave Multipoint Distribution System (MMDS), have strict requirements regarding the transmission of signals by a mobile subscriber unit outside of the provider's service area. Such restrictions preclude the typical registration process by wireless mobile units, namely, periodic transmissions of the device identity. Therefore, embodiments of the present invention are very advantageous because an access scheme in which the network retains complete control of subscriber unit transmissions is provided. In embodiments of the present invention, the network can provide wireless access to mobile subscriber units without the need for the mobile units to transmit any apriori information.

The motivation behind this invention is to provide a technique by which the network can grant wireless access (that is, the right to transmit an access request) to valid subscriber units within the desired network operator's region, while guaranteeing that these mobile subscriber units do not transmit any signal when outside of the desired operator's region. As such, the mobile subscriber units do not potentially interfere with other operators' networks when outside of the desired operator's region.

With continuing reference to FIG. 1, a subscriber unit 40 is configured to listen for a device identity corresponding to the user subscriber unit 40. Further, user subscriber unit 40 is configured to transmit a request for network access upon receiving the device identity corresponding to user subscriber unit 40. Base station 20 is configured to transmit a set of device identities corresponding to a set of valid subscriber units. Further, base station 20 is preferably configured to grant a specified amount of time for response from the set of valid subscriber units upon transmitting the set of device identities. Base station 20 may then grant network access to user subscriber unit 40 upon receiving the request for network access at base station 20 within the specified timed response. Base station 20 may be configured locally or remotely from a centralized subscriber access device control platform 54 via configuration signaling links 56.

As shown in FIG. 1, transmitter/receiver 30 at base station 20 transmits a set of device identities corresponding to a set of valid subscriber units, with the transmission being indicated at 42. Because user subscriber unit 40 has a device identity that is within the set of valid subscriber units, user subscriber unit 40 is permitted to transmit a request for network access, as is indicated at transmission 44. That is, user subscriber unit 40 listens before talking.

Another user subscriber unit 50 is also shown in FIG. 1, and is located near base station 22. Transmitter/receiver 32 of base station 22 transmits a set of device identities corresponding to a set of valid subscriber units with the transmission being indicated at 52. Because user subscriber unit 50 has a device identity that is not within the set of valid subscriber units that base station 22 is willing to grant network access, user subscriber unit 50 is not permitted to transmit a request for network access. As such, no transmission is illustrated.

As understood by examining FIG. 1, the network controls which user devices are permitted to transmit. As shown, user subscriber unit 40 is permitted to transmit when in proximity of base station 20. Also as shown, user subscriber device 50 is not permitted to transmit when in proximity of base station 22. This listen-before-talk technique may be utilized to prevent mobile subscriber units from potentially interfering with another operator's network. Further, the listen-before-talk technique may be utilized to limit a user subscriber unit's transmission to a specific fixed geographic area contained within the network of a single provider.

In the wireless system of the present invention, it may be suitable to set aside a separate set of channels for control, paging, and access requests within the system architecture. The system architecture may be suitably implemented in Microwave Multipoint Distribution System (MMDS) or Industrial, Scientific, and Medical (ISM) bands, but its utility is not limited to these bands. Further, the device identities may be suitably implemented as unique electronic serial numbers (ESN) assigned to and embedded in each subscriber unit. As such, the use of electronic serial numbers allows records of the valid subscribers' electronic serial numbers to be kept.

Advantageously, in accordance with the present invention, subscriber units operate preferably in a completely listen-before-talk mode. That is, the subscriber unit is not allowed to transmit any information whatsoever prior to being granted permission to do so by the network.

Figures 2, 3:
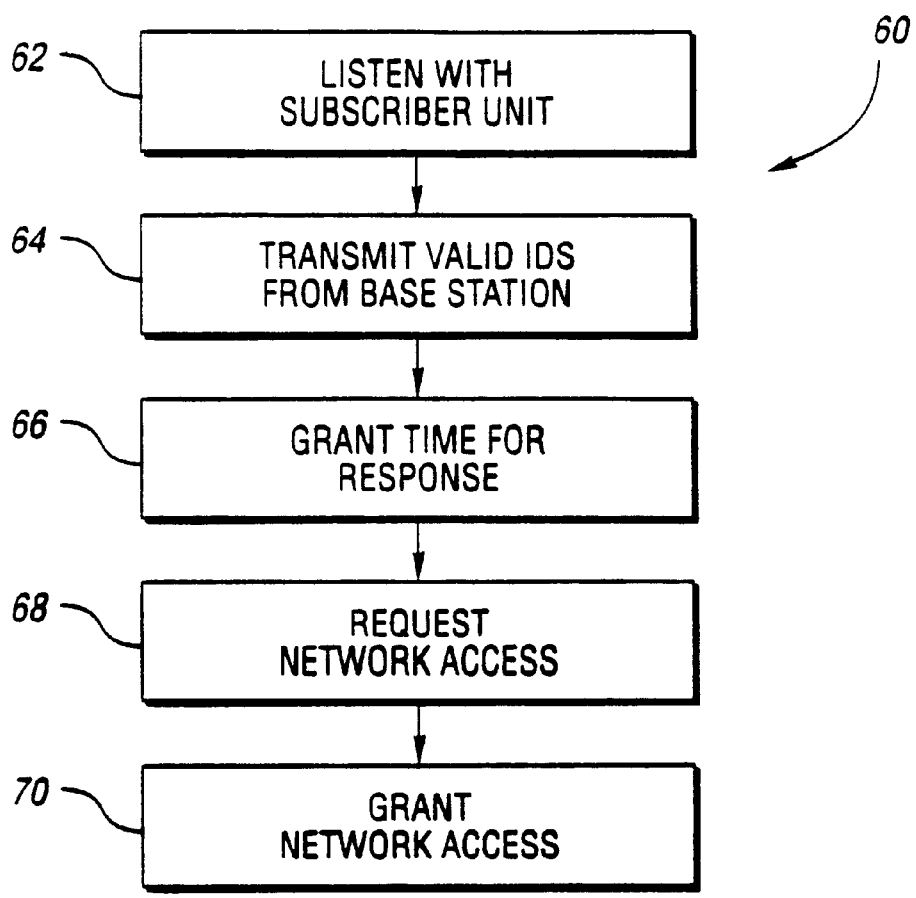
FIG. 2 is a block diagram illustrating a method of the present invention for controlling wireless network access in a preferred embodiment of the present invention.
FIG. 3 is a block diagram illustrating additional capabilities in preferred embodiments of the present invention.

With reference to FIG. 2, a preferred method of the present invention is generally indicated at 60. At block 62, the user subscriber unit listens. At block 64, valid device identities are transmitted from a base station. At block 66, the base station grants a specified time for response by the user devices. At block 68, a request for network access is transmitted by the subscriber unit only when the subscriber unit device identity was one of the valid device identities transmitted from the base station. At block 70, the base station grants network access to the subscriber unit.

In FIG. 3, in a preferred embodiment of the present invention, the base station controls the amount of transmission power used at the subscriber unit, as indicated at block 82. Further, in preferred embodiments, the base station is capable of sending a terminate request to the subscriber unit at any time as indicated at block 84. Also, the subscriber unit is preferably capable of sending a terminate request to the base station. After such a request has been received by either the base station or the subscriber unit, the subscriber unit must again wait for its (preferably unique) device identify to be transmitted by the base station before an access request can be transmitted.

With reference to FIG. 4, operation of embodiments of the present invention is illustrated. A base station 86 and a subscriber unit 88 communicate as generally indicated at 90 and 92, respectively. When the base station system is on (block 94), and the subscriber unit is powered on (block 96) subscriber unit 88 must go into a receive-only mode where subscriber unit 88 monitors the desired network's control channel or channels, which are continuously transmitted by the base station. Monitoring the control channel is indicated at block 100.

Base station 86 transmits the device identities, which are preferably electronic serial numbers, of the set of valid subscriber units over the control channel, as indicated at block 98. Upon receiving its own electronic serial number at decision block 102, subscriber unit 88 is free to request system access at block 104. System access is a dedicated wireless traffic channel. System access is requested through the access request channel, and the request may be made during a specified period of time for response that the base station allows. After this period of time expires, subscriber unit 88 must again wait to receive its own electronic serial number over the control channel before network access can be requested (block 103). If an access request is received at decision block 106 during the specified period of time, the traffic channel is granted at block 108.

Once the traffic channel is established, and the subscriber unit realizes that the channel has been granted (block 110), base station 86 and subscriber unit 88 may freely transmit and receive data as indicated at blocks 112 and 114. As mentioned previously, base station 86 is preferably permitted to terminate the connection (block 116) at anytime. Further, subscriber unit 88 is also permitted to terminate the connection at any time, as indicated at block 118.

Various approaches may be taken to broadcast subscriber unit electronic serial numbers (or other suitable device identities) over the control channels of the numerous base stations. One simplistic method is to have every base station transmit the electronic serial numbers of all valid subscriber units in a fixed region on a continual basis. While this may be the simplest method operationally, another method would require the network to keep track of which base stations are accessed most often by each subscriber unit in a subscriber access device control platform 54. The base stations on this list would then be required to transmit the electronic serial numbers of their resident subscriber units on a continual basis, whereas other base stations would only transmit these electronic serial numbers on a periodic basis with a larger time interval. That is, different time intervals may be used for the periodic transmissions of different groups of subscribers. In some cases, it may be desirable to use wildcard or truncation characters to simultaneously enable a block of devices having similar identities.

It is to be appreciated that the device identity sets transmitted from a base station may be selected and transmitted in numerous ways. For example, the device identities to be broadcast could be determined based on the base station location. Further, network intelligence could be implemented such that the time duration between instances at which a particular device identity is broadcast may be based on the network usage habits for that user subscriber device. As such, more frequent usage of a subscriber device within the range of a particular base station would result in more frequent broadcasting of that device identity from that base station.

Still further, the set of device identities that are transmitted from a particular base station may consist of any number of device identity subsets. Each subset of device identities may then be transmitted on a generally periodic basis with a period that reflects usage patterns for the devices within that particular subset. That is, there may be multiple levels of usage that correspond to multiple subsets of device identities such as heavy use, moderate use, occasionally use, and rare use. In this example, the heavy use subset of device identities would be transmitted more often than the moderate use, and so on. Of course, the subsets may be updated in real-time by appropriate network intelligence.

In preferred embodiments of the present invention, after a traffic channel has been established, a closed-loop power control system allows the base station to control the transmit power of the subscriber unit. Further, and as mentioned above, the base station can also discontinue transmissions by the subscriber unit altogether if need be. In such a case, the subscriber unit would then be required to wait until it received its own electronic serial number (or other suitable device identity) on the base station's control channel before transmitting an access request.

Embodiments of the present invention have many advantages, and it is appreciated that the listen-before-talk techniques utilized for controlling wireless network access allow the subscriber unit to request wireless access on an as-needed basis. Advantageously, this provides wireless access while minimizing interference to other service providers or interference to other areas of the desired provider's network where network access is not permitted. It is to be appreciated by those skilled in the art that the subscriber units may take many forms, including wireless modems for Internet access, video services, and/or data services.

It is to be appreciated by those skilled in the art that the transmission containing the valid device identities (or equivalently, the exception list) may take many forms. One example of a transmission of device identities is described herein below. Of course, it is to be appreciated that the transmission method described below is exemplary only, and that many other techniques are appreciated by those skilled in the communication arts. In the example, the transmission of the set of device identities begins with a synchronization bit. Next, the number of available channels is transmitted, followed by the number of frames to be transmitted. After the synchronization bit, number of channels, and number of frames have each been transmitted, the number of bits per channel for each channel is transmitted. That is, each channel is allocated a certain number of bits per frame, which may vary from channel to channel.

At this point, the first frame is transmitted. In this example, the transmission of the first frame is accomplished by transmitting a first number of bits of information for the first channel, followed by transmitting a second number of bits for the second channel, and so on. The number of bits transmitted for each channel is the same number as set forth previously. Successive frames then take the same form as the first frame, meaning that the allocated number of bits is transmitted for each channel in sequence.

The different channels may represent different types of users such as, for example, a first channel may represent local users while a second channel represents roaming users, and so on. As such, the bits per channel for the local user channel may be greater than the bits per channel for the roaming user channel so that in a given frame, more information is transmitted that relates to the local users than that relates to the roaming users. The information transmitted represents the valid user device identities, and the information may be broken up and take several frames to be sent in its entirety. Further, different lists (on different channels) may take different numbers of frames to be transmitted.

Further, in accordance with the present invention, the use of a temporary device identity is contemplated. A base station may assign a temporary device identity to a plurality of devices. As such, after assignment, the base station may transmit the temporary device identity to indicate that any of the devices represented by that temporary device identity have permission to access the network. Of course, it is appreciated that the assigning of the temporary device identity should be repeated on a generally periodic basis. That is, a particular user device with its corresponding device identity may be assigned a plurality of different temporary device identities representing a plurality of different device groups that the particular device belongs to. On the other hand, a particular temporary device identity may represent a plurality of different user subscriber devices that belong to a group.

It is to be appreciated that the use of a temporary device identity to represent a plurality of different user subscriber devices allows simulcasting. That is, the base station, using the temporary device identity, may simultaneously broadcast data to a group of users if multiple users are assigned to the same temporary device identity. Each device may have multiple temporary device identities which could be used to establish multiple virtual connections. As such, this particular aspect of the present invention may be useful to provide a similar capability of establishing multiple virtual connections using a synchronous transfer mode (ATM) or Internet protocol (IP) networks.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for controlling wireless network access for a wireless user subscriber unit having a device identity, the method comprising:

listening with the user subscriber unit;

transmitting a set of device identities corresponding to a set of valid subscriber units from a base station;

granting a specified amount of time for response to the set of valid subscriber units upon transmitting the set of device identities;

upon receiving the device identity corresponding to the user subscriber unit, transmitting a request for network access with the user subscriber unit within the specified amount of time; and granting network access to the user subscriber unit upon receiving the request for network access at the base station.

2. A system for controlling wireless network access, the system comprising:

a user subscriber unit configured to listen for a device identity corresponding to the user subscriber unit, and configured to transmit a request for network access upon receiving the device identity corresponding to the user subscriber unit when network access is desired; and a base station configured to transmit a set of device identities corresponding to a set of valid subscriber units, and configured to grant a specified amount of time for response to the set of valid subscriber units upon transmitting the set of device identities, and further configured to grant network access to the user subscriber unit upon receiving the request for network access at the base station within the specified time for response.

3. A user wireless device for use in a wireless network in which the user wireless device is permitted to access the network when the user wireless device is within a preselected fixed region with at least one base station in the region that is operative to permit network access for a predetermined plurality of wireless devices including the user wireless device, the user wireless device comprising:

a user subscriber unit configured to listen for a device identity corresponding to the user subscriber unit, the device identity being transmitted along with a plurality of other device identities corresponding to other wireless devices by the at least one base station, and the user subscriber unit being further configured to transmit a request for network access after receiving the device identity corresponding to the user subscriber unit when network access is desired.

4. The user wireless device of claim 3 wherein the user subscriber unit is further configured to listen for a temporary device identity that represents a plurality of device identities including the device identity corresponding to the user subscriber unit.

5. A system for controlling wireless network access, the system comprising:

a user subscriber unit configured to listen for a device identity corresponding to the user subscriber unit, and configured to transmit a request for network access upon receiving the device identity corresponding to the user subscriber unit when network access is desired; and a base station configured to transmit a set of device identities corresponding to a set of valid subscriber units.

6. The system of claim 5 wherein the base station is further configured to transmit a first set of device identities corresponding to a first set of valid subscriber units from the base station on a generally periodic basis with a first period, and is further configured to transmit a second set of device identities corresponding to a second set of valid subscriber units from the base station on a generally periodic basis with a second period that is different than the first period.

7. The system of claim 5 further comprising:

a plurality of base stations configured to transmit a corresponding plurality of sets of device identities, wherein the set of device identities transmitted from a particular base station is based on a location of the particular base station.

8. The system of claim 5 wherein the base station is further configured to grant a specified amount of time for response to the set of valid subscriber units upon transmitting the set of device identities.

9. The system of claim 5 wherein the base station is further configured to grant network access to the user subscriber unit upon receiving the request for network access at the base station.

10. The system of claim 9 wherein the base station is further configured to send a terminate request from the base station to the user subscriber unit, and wherein the user subscriber unit is further configured to discontinue transmissions upon receiving the terminate request at the user subscriber unit.

11. The system of claim 9 wherein the user subscriber unit is further configured to send a terminate request from the user subscriber unit to the base station, and wherein the base station is further configured to discontinue transmissions upon receiving the terminate request at the base station.

12. The system of claim 9 wherein the base station is further configured to control a transmit power of the user subscriber unit from the base station.

13. The system of claim 5 wherein each device identity is an electronic serial number.

14. A method for controlling wireless network access for a wireless user subscriber unit having a device identity, the method comprising:

listening with the user subscriber unit;

transmitting a set of device identities corresponding to a set of valid subscriber units from a base station; and upon receiving the device identity corresponding to the user subscriber unit, transmitting a request for network access with the user subscriber unit.

15. The method of claim 14 wherein transmitting the set of device identities further comprises:

transmitting a first set of device identities corresponding to a first set of valid subscriber units from the base station on a generally periodic basis with a first period; and transmitting at least one additional set of device identities corresponding to at least one additional set of valid subscriber units from the base station on a generally periodic basis with a corresponding period that is different than the first period.

16. The method of claim 14 wherein transmitting the set of device identities further comprises:

transmitting a plurality of sets of device identities from a corresponding plurality of base stations, wherein the set of device identities transmitted from a particular base station is based on a location of the particular base station.

17. The method of claim 16 wherein the set of device identities transmitted from a particular base station is further based on network intelligence relating to subscriber device usage.

18. The method of claim 14 further comprising:

granting a specified amount of time for response to the set of valid subscriber units upon transmitting the set of device identities, wherein the request for network access is transmitted by the user subscriber unit within the specified amount of time.

19. The method of claim 14 further comprising:

granting network access to the user subscriber unit upon receiving the request for network access at the base station.

20. The method of claim 19 further comprising:

sending a terminate request from the base station to the user subscriber unit; and discontinuing transmissions between the user subscriber unit and the base station upon receiving the terminate request at the user subscriber unit.

21. The method of claim 19 further comprising:

sending a terminate request from the user subscriber unit to the base station; and discontinuing transmissions between the user subscriber unit and the base station upon receiving the terminate request at the base station.

22. The method of claim 19 further comprising:

controlling a transmit power of the user subscriber unit from the base station.

23. The method of claim 14 wherein each device identity is an electronic serial number.

* * * * *